United States Patent [19]
Yamauchi et al.

[11] 3,964,026
[45] June 15, 1976

[54] SEQUENCE BLOCK DISPLAY SYSTEM

[75] Inventors: Nobuharu Yamauchi; Masaji Matsumura; Katsuhide Morimoto, all of Amagasaki; Haruo Koyanagi, Musashimurayama; Iwao Sato, Komae; Buhei Yasuhara, Tokyo; Jiro Sakai, Tokyo, all of Japan

[73] Assignees: Nissan Motor Co., Ltd., Tokyo; Mitsubishi Denki Kabushiki Kaisha, both of Japan

[22] Filed: May 20, 1974

[21] Appl. No.: 471,552

[30] Foreign Application Priority Data
May 22, 1973   Japan.............. 48-57454
May 22, 1973   Japan.............. 48-57455

[52] U.S. Cl.................. 340/172.5; 235/151.11
[51] Int. Cl.²........................................ G06F 3/14
[58] Field of Search............ 340/172.5, 324 A, 325, 340/213 Q, 225; 235/151.11

[56] References Cited
UNITED STATES PATENTS

| | | |
|---|---|---|
| 3,593,316 | 7/1971 | Frieband et al................. 340/172.5 |
| 3,706,075 | 12/1972 | Fredrickson et al............ 340/172.5 |
| 3,803,559 | 4/1974 | Bandoo et al.................. 340/172.5 |
| 3,829,842 | 8/1974 | Langdon et al.............. 235/151.11 X |

*Primary Examiner*—Malcolm A. Morrison
*Assistant Examiner*—Jerry Smith
*Attorney, Agent, or Firm*—Oblon, Fisher, Spivak, McClelland & Maier

[57] ABSTRACT

In a programmable logic controller in which the control sequence for a controlled-objective such as a machine tool is stored in a memory unit, and the controlled-objective is automatically operated in a predetermined sequence according to the control sequence stored in the memory unit; a display system is provided in which a sequence block obtained from the control sequence stored in the memory unit is displayed in the form of a sequence diagram, particularly, a sequence diagram which includes symbols of control elements such as relays. A necessary sequence block is automatically obtained from the control sequence and is displayed. This display system is capable of displaying the states of the control elements, such as the on-off states of relay contacts.

4 Claims, 10 Drawing Figures

(a)

(b)

F I G. 7
(a) (b)
F I G. 8
(a) (b)
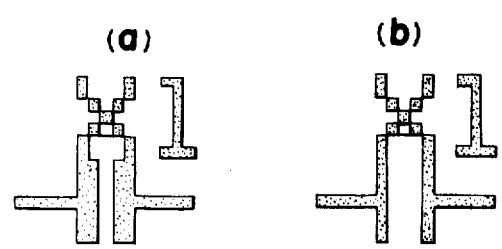
F I G. 9
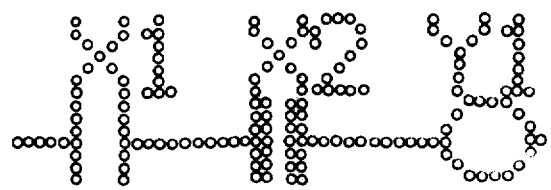

SEQUENCE BLOCK DISPLAY SYSTEM

BACKGROUND OF THE INVENTION

1. Field of the Invention

The present invention relates to a display system used with a sequence controller for automatically operating a controlled-objective according to a control sequence stored in a memory unit. The invention relates more particularly to a display system capable of displaying a necessary sequence block obtained from the control sequence stored in the memory unit.

2. Description of the Prior Art

The sequence controller which automatically controls a controlled-objective such as a machine tool in a predetermined sequence usually comprises a memory unit in which a control sequence is stored. The control sequence includes a large number of instructions. It is often necessary to search the desired sequence block which is made up of several instructions and to display it. This need arises when, for example, a certain specific block of a control sequence is desired to be partially checked or modified. To do this, the content of the block to be modified must be checked and the desired sequence block must be obtained and displayed. In practice, however, it is not easy to obtain only the desired sequence block from the control sequence stored in the memory unit. In the memory unit, instructions are stored at addresses in a regular order, and several instructions which constitute a sequence block to be searched are stored in several memory cells with a series of memory address numbers. In particular, it is difficult to know the memory address number of the first instruction and the memory address number of the last instruction of the sequence block to be reviewed.

One solution to this problem is the use of a table setting forth instructions and their memory cells with memory address numbers on which the desired sequence block can be found. This table seems convenient, but it takes time to prepare and a considerable amount of effort is needed to find the desired sequence block from the table. Another solution is the display of the whole control sequence from which the desired sequence block may be found. This, however, also requires a large expenditure of time and for that reason is impractical.

SUMMARY OF THE INVENTION

A first object of the invention is to provide an improved display system capable of automatically retrieving, according to a search command, the desired sequence block from the control sequence stored in a memory unit and displaying it.

The individual instructions of a control sequence are stored in memory cells of the memory unit, usually in terms of logical symbols. Usually binary codes are used for a logical symbol. If such logical symbol is displayed directly, it is difficult to understand what is displayed on the screen. Therefore, the logical symbol is converted into a character which is then displayed. The present inventor has previously proposed a display system in which a control sequence stored in the form of logical symbols is displayed in a sequence diagram which includes symbols of control elements such as relay contacts (as disclosed in Japanese Pat. application Nos. 50163/1973 and 50421/1973). This proposition was made in view of the fact that a machine tool is controlled through the combination of many control elements, such as electromagnetic relays, solenoid valves, limit switches or electric motors, and that the operator is familiar with a sequence diagram which includes control elements such as relay contacts and the like.

To utilize the display of a control sequence in the form of a sequence diagram which includes control elements, it is desirable that the necessary sequence block retrieved from the control sequence stored in the memory unit be displayed in the form of a sequence diagram. At the same time, it is also desired that the state of each control element be displayed.

Therefore, a second object of the invention is to provide an improved display system in which the desired sequence block is automatically retrieved from the control sequence stored in the memory unit according to a search command and the retrieved sequence block is displayed in the form of a sequence diagram which includes control elements, together with the state of each control element.

Other objects will appear hereinafter.

These and other objects are achieved by a sequence block display system used with a sequence controller for controlling a controlled-objective in a predetermined sequence wherein the sequence controller comprises a memory unit which stores a control sequence, and wherein the control sequence includes a plurality of sequence blocks, each sequence block comprising a plurality of instructions, said display system comprising a search section for searching a sequence block from the control sequence stored in the memory unit, the search section being capable of generating a coincidence signal when coincidence is detected between the instruction read in succession from the memory unit and the instruction included in the sequence block to be retrieved; a sequence block section including a display device; a memory for storing the instructions of a sequence block in a form suited for display; a control unit which receives the coincidence signal from the search section and causes said memory to store, according to the coincidence signal, the instructions of the sequence block in a form suited for display, the control unit being capable of repeatedly reading the data in the memory and displaying them on the display device.

BRIEF DESCRIPTION OF THE DRAWINGS

Other objects and advantages will become apparent to persons skilled in the art to which the invention relates in the course of the following description of the preferred embodiments illustrated by way of example in the accompanying drawings, in which:

FIGS. 7 to 9 are diagrams showing examples of displays obtained according to the second and third embodiment of the invention.

DETAILED DESCRIPTION OF THE PREFERRED EMBODIMENTS

Figure 1:
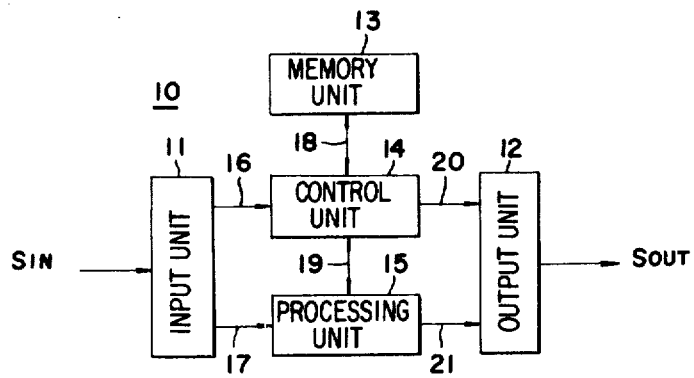
FIG. 1 is a block diagram showing a sequence controller associated with a display system of the invention.

Referring to FIG. 1, there is shown in block form a sequence contoller 10 associated with a display system of the invention. This sequence controller itself is well-known, comprising an input unit 11, and output unit 12, a memory unit 13, a control unit 14, and a processing unit 15. The sequence controller 10 automatically operates a controlled-objective in a predetermined sequence. Machines and appratus to be controlled by this sequence controller include machine tools and various processing apparatus used in the manufacture of products.

The input unit 11 receives an input signal $S_{IN}$ which carries various information about the controlled-objective. This input signal is provided, for example, from a number of contacts. The input unit 11 is connected to the control unit 14 through a line 16, and also to the processing unit 15 through a line 17. The control unit 14 is connected to the memory unit 13 through a line 18, and to the processing unit 15 through a line 19. The output unit 12 is connected to the control unit 14 through a line 20, and to the processing unit 15 through a line 21. The output unit 12 generates an output signal $S_{OUT}$ to operate the controlled-objective.

Figure 1A:
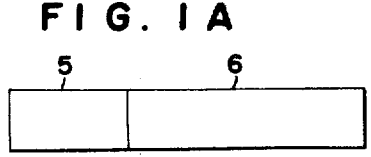
FIG. 1A is a format of an instruction stored in the memory unit of a sequence controller.

The memory unit 13 stores a control sequence to operate the controlled objective in a predetermined sequence. The memory unit 13 comprises a read only memory or a random access memory. The control sequence comprises a number of instructions for performing various processing steps. The memory unit 13 has many memory cells with addresses in a regular order. Several instructions of a control sequence are stored in the individual memory cells in a given order. A series of several instructions set up a sequence block having certain functions. A control sequence consists of a number of such sequence blocks. A series of several instructions included in each sequence block are stored orderly in a series of memory cells with a series of addresses. Each instruction is of binary code made up of a plurality of bits such as, for example, 8 or 16 bits. An example of the instruction format is shown in FIG. 1A which is composed of an instruction part 5 and a part 6 designating input and output data relevant to the instruction part 5. The instruction part contains instruction data for the necessary processing.

The control unit 14 reads instructions in succession which are stored in the respective memory cells through a line 18. The read instructions are supplied to the control unit 14 through the line 18. The control unit decodes these instructions and supplies a processing instruction to the processing unit 15. The processing unit derives from the input unit 11 through the line 17 data from input signal $S_{IN}$ according to the processing instruction and supplies the processed result to the output unit 12. The output obtained as a result of the processing is supplied to the control unit 14 when necessary. Also, this output is supplied to the memory unit 13 and stored therein when necessary.

Figure 2:
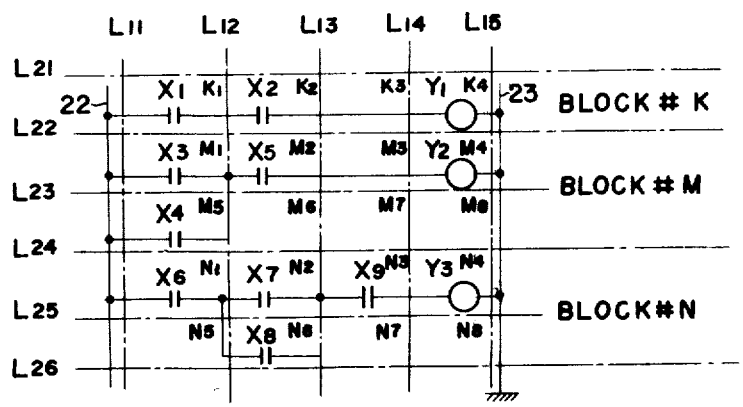
FIG. 2 is a sequence diagram showing a sequential circuit representing a control sequence stored in the memory unit of a sequence controller.

The control sequence stored in the memory unit 13 can be expressed in the form of a relay circuit diagram. FIG. 2 shows a relay circuit diagram representing part of the control sequence stored in the memory unit 13. This relay circuit indicates the Kth, Mth and Nth ones of many sequence blocks contained in the control sequence. In FIG. 2, two lines 22 and 23 are common to the individual sequence blocks. The line 22 is a power source line. The line 23 is a common potential line, i.e., a ground.

The relay circuit diagram in FIG. 2 may be viewed in four sections divided by imaginary lines $L_{11}$ to $L_{15}$ which run longitudinally and parallel with each other. The sequence block # K is a block between two lateral imaginary lines $L_{21}$ and $L_{22}$ and has four sections $K_1$ to $K_4$. The sequence block # M is between two lateral imaginary lines $L_{22}$ and $L_{24}$. This block is further divided by another imaginary line $L_{23}$ between the two lines $L_{22}$ and $L_{24}$. Thus this block has 8 sections $M_1$ to $M_8$. The sequence block # N has 8 sections $N_1$ to $N_8$ being divided by two imaginary lines $L_{24}$ and $L_{26}$ and another imaginary line $L_{25}$ drawn between $L_{24}$ and $L_{26}$.

The sections $K_1$, $K_2$ and $K_4$ of the sequence block # K have an input element $X_1$, an input element $X_2$, and an output element $Y_1$ respectively, which are connected in series between lines 22 and 23. The sections $M_1$, $M_2$, $M_4$ and $M_5$ of the sequence block # M have an input element $X_3$, an input element $X_5$, an output element $Y_2$ and an input element $X_4$ respectively. The input elements $X_3$ and $X_5$ and the output element $Y_2$ are connected in series between lines 22 and 23, and the input element $X_4$ is connected in parallel with the input element $X_3$. The sections $N_1$, $N_2$, $N_3$, $N_4$ and $N_6$ of the sequence block # N have an input element $X_6$, an input element $X_7$, an input element $X_9$, an output element $Y_3$, and an input element $X_8$ respectively. The input element $X_6$, $X_7$, $X_9$ and the output element $Y_3$ are connected in series between lines 22 and 23, and the input element $X_8$ is connected in parallel with the input element $X_7$. Each input element $X_1$-$X_8$ and each output element $Y_1$-$Y_3$ is a control element. Each input element $X_1$-$X_8$ is an input contact such as a relay contact, or limit switch, and each output element $Y_1$-$Y_3$ is a relay, a solenoid valve, or an electric motor.

These blocks may be expressed in terms of Boolean algebra; that is, the block # K as $X_1.X_2 = Y_1$, the block # M as $X_3.X_5 + X_4.X_5 = Y_2$, and the block # N as $X_6.X_7.X_9 + X_6.X_8.X_9 = Y_3$. The block # K is stored in the memory unit 13 in terms of instructions which include the instructions for deriving from the input signal $S_{IN}$ the data concerning the input contact $X_1$ and storing this data, the instruction for deriving from the input signal $S_{IN}$ the data concerning the contact $X_2$ and subjecting the data of $X_1$ and $X_2$ to AND logic, and the instruction for causing an output to be generated to drive the element $Y_1$ when the AND logic results in 1. These instructions are stored in memory cells with a series of addresses in the memory unit 13. The blocks # M and # N are stored in the memory unit in the same manner.

It is to be noted that the last one of a series of instructions which constitute each sequence block is in the form of an output instruction. The last instructions in the sequence blocks # K, # M and # N correspond to the elements $Y_1$, $Y_2$ and $Y_3$ respectively. These output instructions can be discriminated from other instructions when stored. For example, when one instruction is made up of an n-number of binary bits, the k-th bit is determined to be 1 for the instruction in the output format and 0 for other instructions. This discrimination can be utilized when the first instruction of each sequence block is detected. That is, when an instruction, not in the output format, is read immediately after the instruction in the output format during the reading of a series of instructions in the order of a series of addresses from the memory cells, the read instruction can be judged to be the first instruction of a sequence block. The judging function is utilized for the display system of this invention. When the first instruction of each sequence block is stored in a form which can be discriminated from others, this arrangement will enable the first instruction of a sequence block to be detected.

It is to be noted also that the instruction which assumes an output format in each sequence block is peculiar to a specific sequence block, and generally no instruction which assumes the same output format is present in other sequence blocks. For example, the last instruction of the sequence block # K, i.e., the instruction to drive the element $Y_1$, is not normally present in other sequence blocks. In other words, the desired sequence block can be searched by designating the content of the last instruction of the sequence block.

Figure 3:
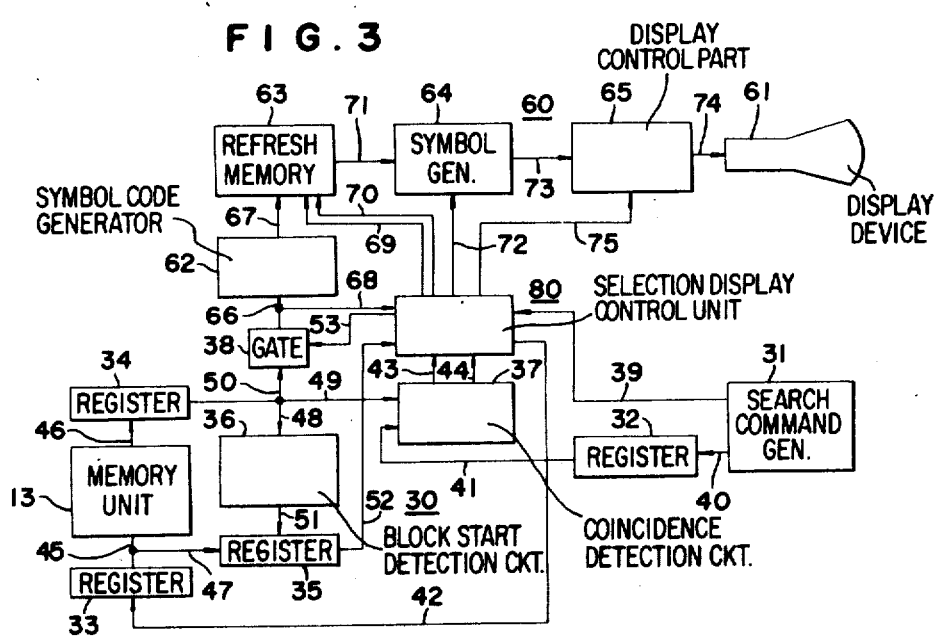
FIG. 3 is a block diagram showing a first embodiment of the invention.

Referring to FIG. 3, there is shown a first embodiment of the invention including a memory unit 13 of a sequence controller 10. This display system comprises a search section 30 for retrieving the desired one from among many sequence blocks stored in the memory unit 13, a display section 60 for displaying the retrieved sequence block in the form of a sequence diagram, and a selective display control unit 80 which controls the sections 30 and 60.

The search section 30 has a search command generator 31, first to fourth registers 32, 33, 34 and 35, a block start detection circuit 36, a coincidence detection circuit 37, and a gate 38. These elements operate relative to the selective display control unit 80. The search command generator 31 is connected to the control unit 80 through a line 39, and to the first register 32 through a line 40. The search command generator 31 may be in the form of a keyboard used in an electronic computer or the like. The search command generator 31 supplies a search command through a line 39 to the control unit 80, and the last instruction of a sequence block to be searched to the register 32 through the line 40. The register 32 holds this last instruction and supplies it to the coincidence detection circuit 37 through a line 41.

The control unit 80 is connected to the second register 33 through a line 42. This control unit, when given a search command through the line 39, sets into the register 33 the memory address number corresponding to the first memory cell of the memory unit 13. The control unit 80 is connected to the coincidence detection circuit 37 through lines 43 and 44. When a discoincidence signal is supplied from the line 43 as a result that an address number is set in the register 33, the control unit 80 sets the next memory address number in the register 33. This operation is repeated each time a discoincidence signal is generated and thus the following memory address number is set in the register 33 one after another.

The register 33 designates a memory address number in the memory unit 13 through a line 45. The data in the memory cell corresponding to the designated memory address number is transferred to the third register 34 through a line 46. The register 33 is connected to the fourth register 35 via a line 47.

The register 34 is connected to the block start detection circuit 36, coincidence detection circuit 37 and gate 38 through lines 48, 49 and 50 respectively. The block start detection circuit 36 judges whether the data supplied from the memory cell to the register 34 is of the first instruction of a sequence block. This judgement is dependent on the fact that the last instruction of each sequence block assumes the format of an output instruction as described previously. Thus, when an instruction, not in the form of an output instruction is supplied to the register 34 after an instruction which assumes the form of an output instruction, this indicates that it is the first instruction of a sequence block. The block start detection circuit 36 is connected to the register 35 through a line 51. This line is a set line for the register 35. When the detection circuit 36 detects the first instruction of a sequence block, a memory address number corresponding to the detected instruction is set in the register 35 from the register 33 by way of the set line 51. When an instruction other than the first instruction of each sequence block is read and set in the register 34 by a command from the register 33, the memory address number corresponding to the read instruction is prevented from being set in the register 35 from the register 33. Consequently, the register 35 holds the memory address number corresponding to the first instruction of a sequence block until the first instruction of the following sequence block is read.

The coincidence detection circuit 37 receives the data of instructions transferred one after another to the register 34 through a line 49, and collates them, one by one, with the data in the register 32, i.e., the data of the last instruction of a sequence block to be selected. If no coincidence is detected, the coincidence detection circuit 37 supplies a discoincidence signal to the control unit 80 via the line 43.

When coincidence is detected between the data in the register 34 and the data in the register 32, a coincidence signal is supplied from the coincidence detection circuit 37 to the control unit 80 through line 44. This coincidence signal serves to prevent the next memory address number from being set in the register 33 and to read the memory address number set in the register 35 through line 52. Note that when a coincidence signal is given, the register 35 has the memory address number of the first instruction of a sequence block to be selected.

The control unit 80 sets in the register 33 again the memory address number read from the register 35 according to the coincidence signal, and opens the gate 38 via line 53. Therefore, the first instruction of a sequence block to be selected is read and registered in the register 34. This data goes out of the gate 38. On the other hand, the data transferred to the register 34 is supplied to the coincidence detection circuit 37. The coincidence detection circuit 37 collates this data with the data in the register 32 again. When no coincidence is detected, the circuit 37 supplies a discoincidence signal to the control unit 80, and sets the next memory address number in the register 33. This operation continues until a coincidence is reached again between the data in the registers 32 and 34. The instructions of a sequence block to be searched are read in succession and supplied through the gate 38. When coincidence is reached again between the data in the registers 32 and 34 (this shows that the last instruction of a sequence block to be searched is read into the register 34), the coincidence detection circuit 37 supplies a coincidence signal again to the control unit 80. After the output of data from the register 34 has been supplied through the gate 38, the control unit 80 closes the gate 38 and ends the search operation due to the coincidence signal again being supplied.

The display section 60 will be described below. This display section has a display device 61, which may be a known cathode-ray tube having a plurality of display areas on its screen. Other display devices, such as a plasma display panel, or a display device having a plurality of display tubes may be used for the display device 61. Each display area may be, for example, rectangular in a matrix form, and the individual display areas are adjacent to each other across column and row lines. The number of display areas is determined according to the relay circuit diagram to be displayed. For instance, to display a relay circuit diagram shown in FIG. 2, at least four display areas are provided along each row. Each display area consists of a plurality of dots such as a 14x15 dot matrix.

The display section 60 has a symbol code generator 62, a refresh memory 63, a symbol generator 64, and a display control part 65. The symbol code generator 62 is connected to the output of the gate 38 of the search section 30 by line 66. This symbol code generator converts the data contained in the instructions of the searched sequence block into a symbol code for display. The output of the symbol code generator is connected to the refresh memory 63 through a line 67. The symbol code output is supplied one by one to the refresh memory 63 through a line 67.

The refresh memory 63 has a number of memory cells equal to the number of display areas on the screen of the display device 61. The memory cells of the memory 63 are arranged in a matrix form like display areas on the screen. The number of memory cells along each column of the matrix is equal to the number of display areas arranged along each column thereof. Similarly, it is desirable that the number of memory cells along each row be equal to the number of display areas along each row thereof. These memory cells are given memory address number in a regular order, from the leftmost memory cell in the first row. The rightmost memory cell on the last row has the last address number.

The symbol codes from the line 67 are stored in succession in the individual memory cells of the refresh memory 63 under the control of control unit 80. The control unit 80 is connected to the output of the gate 38 via line 68. The control unit 80 receives instructions which hasve been supplied to the symbol code generator 62 and decodes them. The control unit 80 is connected to the refresh memory 63 via line 69, and designates, according to the decoded result, the memory address number of a memory cell in which the symbol code corresponding to each instruction is stored.

A memory address number is designated through the line 69 so that the first instruction of a sequence block is stored in the memory cell located leftmost on a given row. The following instruction is stored in the memory cell located on the right of the first memory cell on the same row if such instruction indicates AND operation, or in the memory cell located on the next row if such instruction indicates OR operation, or in the memory cell located rightmost of the row it it is the last instruction in the output instruction format.

The control unit 80 is connected to the refresh memory 63 through line 70, through which the address of a memory cell to be read from the refresh memory is designated. This addressing is achieved by memory address number. When the last address is designated, the same operation is repeated to designate addresses in succession, from the first address to the last address. As a result, the data in the individual memory cells in the refresh memory 63 are read one after another, from the one located leftmost on the first row to the one located rightmost on the last row. This read operation is repeated at regular intervals.

The symbol code outputs read in sequence from the refresh memory 63 are supplied to the symbol generator 64 through line 71. The symbol generator 64 generates a symbol pattern signal to be displayed on each display area according to the symbol code output. This pattern signal is in the form of a 14x15 dot matrix corresponding to each 14x15 dot matrix display area. The pattern signal comprises a symbol of a control element and its code, and also comprises part of a lead wire indicating the connection relationship. The symbol generator 64 is connected to the control unit 80 through line 72. The line 72 provides the symbol generator 64 with the end of data reading from the individual memory cells.

The pattern signal generated by the symbol generator 64 is supplied to the display control part 65 through line 73, and to the display device 61 through line 74. THe display control part 65 is connected to the control unit 80 via line 75. The display control part 65 performs raster control which designates the display area on the display device 61. This raster control is done relative to the address designation read from memory cells of the refresh memory 63. When the data in the m-th memory cell on the n-th row is read, the m-th display unit on the n-th row is scanned for display. As a result, the sequence block stored in the refresh memory 63 is displayed in the form of a sequence diagram on the display screen.

Figure 4:
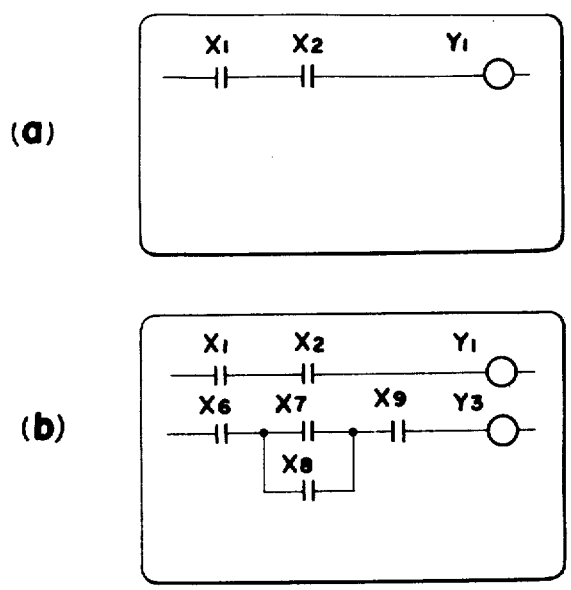
FIG. 4 is a diagram showing an example of a display obtained according to the first embodiment of the invention.

For example, when the sequence block # K in the sequence diagram shown in FIG. 2 is displayed, the last instruction of the block # K, i.e., the instruction corresponding to the relay $Y_1$ in FIG. 2, is given to the register 32 of the search section 30, and then a search command is supplied from the search command generator 31 to the control unit 80. By this operation, the instructions of the block # K are given out in succession from the gate 38 and displayed in the form as shown in FIG. 4(a) on the display screen.

Under the position where the block # K is retrieved and displayed, another block such as # N may be displayed without necessarily erasing the display of the block # K. For this operation, the last instruction of the block # N is supplied to the register 32, and the other instructions of the block # N are transmitted from the gate 38. These instructions are stored in the refresh memory 63 where the instructions of the block # K have already been stored. The display of the two blocks # K and # N is as shown in FIG. 4(b).

Figure 5:
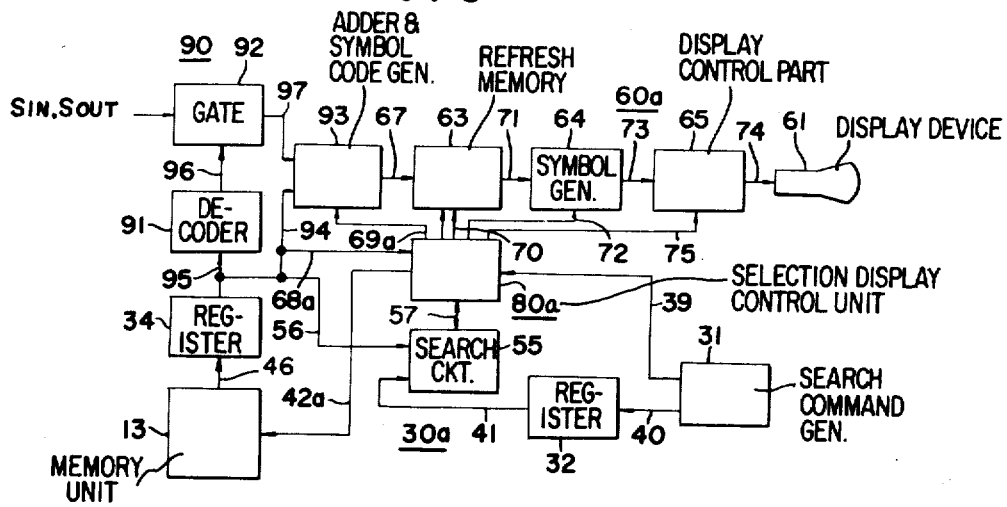
FIG. 5 is a block diagram showing a second embodiment of the invention.

FIG. 5 is a block diagram showing another embodiment of the invention for displaying a retrieved sequence block in a sequence diagram which includes the state of the input and output elements. In this embodiment, a search section 30a, a display section 60a, and a control unit 80a similar to those shown in FIG. 3 are used. The numeral 55 denotes a search circuit comprising a block start detection circuit 36, a register 35, and a coincidence detection circuit 37 which are used in the embodiment shown in FIG. 3. This search circuit 55 receives the output of the register 34 through line 56. The line 56 serves as both the lines 48 and 49 in the embodiment shown in FIG. 3. The control unit 80a is connected to the memory unit 13 via line 42a, and to the search circuit 55 via line 57. The line 42a designates the memory address number of the memory cell to be read out of the memory unit 13. The data on this memory is supplied to the register 35 in the search circuit 55 through line 57. The line 57 serves the same purpose as the lines 43, 44 and 52 in FIG. 3, through which a coincidence or discoincidence signal is supplied to the control unit 80a. The control unit 80a comprises the control unit 80 and the register 33 in FIG. 3.

This embodiment uses a state idicating circuit 90 for displaying the on-off state of relay contacts or the like. This circuit 90 has a decoder 91, a gate 92, and an adder and symbol code generator 93. The output of the register 34 of the search section 30a is connected to the adder and symbol code generator 93 via line 94, and to the decoder 91 via line 95. The gate 92 receives an input signal $S_{IN}$ and an output signal $S_{OUT}$ and is connected to the decoder 91 and to the adder and symbol code generator 93 via lines 96 and 97 respectively. The decoder 91 derives from the signals $S_{IN}$ and $S_{OUT}$ the data corresponding to the data stored in the memory cells of the memory unit 13 which are read in succession to the register 34. The derived data is supplied to the adder and symbol code generator 93 via line 97. The adder and symbol code generator 93 has an adder and a symbol code generator as in FIG. 3 on its output side. This adder and symbol code generator adds up input and output data from the line 97 in relation to the contents in the register 34 which are supplied in succession from the line 94 and supplies the symbol code corresponding to the added result to the refresh memory 63 via line 67. The input and output data from the line 97 indicates the elements of a relay circuit to be displayed, for example, on the on and off states of the relay. The line 97 also indicates the elements of a sequence circuit to be displayed, for example, the on or off state of the input contacts of the circuit. As for a relay, its energized state is indicated. In the input and output data from the line 97, the instruction such as from the line 94 is discriminated by its i-th bit being 0 or 1 according to the input and output data given. The i-th bit is selected from the instruction part 5.

In this embodiment, the gate 38 as used in the embodiment shown in FIG. 3 is not used, and the control unit 80a is connected directly to the register 34 through line 68a. By this arrangement, the control unit 80a decodes instructions not only of a sequence block to be retrieved but also of other sequence blocks. In this embodiment, the line 69a which connects between the control unit 80a and the refresh memory 63 carries a signal determining whether the output of the adder and symbol code generator 93 is stored in the refresh memory 63. This decision is made in reference to the discoincidence or coincidence signal from the search circuit 55. More specifically, the output from the adder and symbol code generator 93 is prevented from being stored in the refresh memory 63 until the first coincidence signal is generated after the search is started according to the search command from the search command generator 31. The output of the adder and symbol code generator is allowed to be stored in the refresh memory only until another coincidence signal is generated. This memory operation is performed as the memory cell is designated for display as in the foregoing manner.

Figure 6:
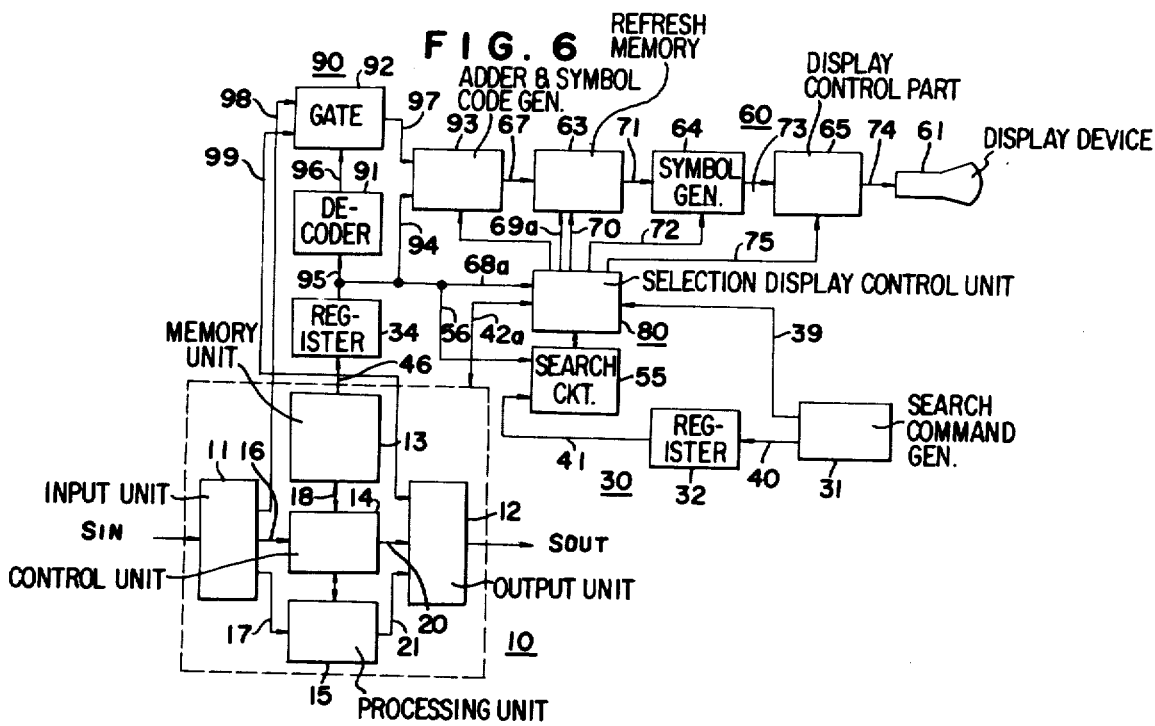
FIG. 6 is a block diagram showing a third embodiment of the invention.

Referring to FIG. 6, a third embodiment is shown wherein the state indicating circuit 90 has its gate 92 connected to an input unit 11 and an output unit 12 of the sequence controller 10 via lines 98 and 99. The signals $S_{IN}$ and $S_{OUT}$ are supplied to the gate 92 through lines 98 and 99.

In this embodiment, no interface part is needed to supply the signals $S_{IN}$ and $S_{OUT}$ to the gate 92.

FIGS. 7(a) and 7(b) show examples of display of input contact in connection with the embodiments as in FIGS. 5 and 6. FIG. 7(a) is an on-state input contact, and (b) an off-state input contact. FIG. 8 is a display showing the symbol of input contact with its code "X1," in addition to the display as in FIG. 7. In FIG. 8, (a) is an on-state, and (b) an off-state. While FIG. 9 shows another example of display showing the block # K as in the embodiments illustrated in FIGS. 5 and 6, wherein the input contact X1 is off, and the input contact X2 is on, and the output element or relay $Y_1$ is de-energized. The energized state of a relay may be indicated by a suitable symbol such as a blacked out circle instead of a white circle which denotes a relay itself.

In the embodiment shown in FIGS. 5 and 6, the instruction from the register 34 and the input and output data from the gate 92 are added together by the adder and symbol code generator 93 and the added data is converted into a symbol code. Alternatively, these data may be converted into respective symbol patterns which may be superposed on each other on the screen of the display device 61.

Obviously, numerous modifications and variations of the present invention are possible in light of the above teachings. It is therefore understood that within the scope of the appended claims, the invention may be practiced otherwise than as specifically described herein.

What is claimed as new and desired to be secured by letters patent of the U.S. is:

1. A sequence block display system used with a sequence controller for controlling a controlled-objective in a predetermined sequence wherein the sequence controller comprises a memory unit which stores a control sequence, and wherein the control sequence includes a plurality of sequence blocks, each sequence block comprising a plurality of instructions, said display system comprising:
   a search section for searching a sequence block from the control sequence stored in the memory unit, the search section being capable of generating a coincidence signal when coincidence is detected between the instruction read in succession from the memory unit and the instruction included in the sequence block to be retrieved;
   a sequence block display section including a display device;
   a memory for storing the instructions of a sequence block in a form suited for display;
   a control unit which receives the coincidence signal from the search section and causes said memory to store, according to the coincidence signal, the instructions of the sequence block in a form suited for display, the control unit being capable of repeatedly reading the data in the memory and displaying them on the display device;
   said search section comprising a first register to which the last instruction of a sequence block to be retrieved is given, a coincidence detection circuit which generates a coincidence signal when coincidence is detected between the instruction read from the memory unit and the instruction registered in the first register, and a second register which generates, when the coincidence signal is generated, a signal of the address in the memory unit where the first instruction of the searched sequence block is stored;

said control unit being capable of designating, according to the coincidence signal, the addresses in succession until the coincidence signal is generated again from the address in the second register, and causing the memory of the display section to store the instructions read for the period from the first coincidence signal to the next coincidence signal;

said display section comprising a symbol generator for converting the read output from the memory into a symbol pattern;

a display control part for controlling the display device according to said read output from the memory;

said display section being arranged to be capable of displaying the instructions of each sequence block in the form of a sequence diagram comprising control elements;

a state indicating circuit for adding additional data to the instructions of the sequence block which are stored in the memory of said display section;

said additional data comprising input and/or output signals to the sequence controller;

said display section displaying the states of said control elements according to said additional data.

2. A display system as claimed in claim 1 wherein a block start detection circuit is used to control the second register so that when the first instruction of each sequence block is detected from among instructions read in succession from the memory unit, the address in which the detected instruction is stored is supplied to the second register.

3. A display system as claimed in claim 1 wherein a third register is used to store the instructions read in succession from the memory unit, the data in the third register being supplied to the coincidence detection circuit for comparison with the data in the first register.

4. A display system as claimed in claim 1 wherein a gate circuit is used to gate the instructions read in succession from the memory unit, the gate circuit being opened under the control of said control unit for the period from the first coincidence signal to the next coincidence signal during which the instructions read from the memory unit are supplied to said memory of the display section.

* * * * *